United States Patent [19]
Guntert

[11] 3,864,851
[45] Feb. 11, 1975

[54] DREDGE CHAIN, SPROCKET, AND COMBINATION

[76] Inventor: Ronald M. Guntert, 2402 Clarendon St., Stockton, Calif. 95204

[22] Filed: Sept. 4, 1973

[21] Appl. No.: 393,952

[52] U.S. Cl. ............ 37/69, 37/191 R, 74/243 DR, 74/246, 198/151
[51] Int. Cl. ............................................. E02f 3/14
[58] Field of Search ........... 74/245 R, 245 C, 245 S, 74/245 LP, 245 P, 246, 250 R, 250 S, 250 C, 252, 253 R, 253 S, 254, 255 R, 255 S, 243 DR; 198/189, 116, 140, 151; 37/69, 191, 192

[56] References Cited
UNITED STATES PATENTS

| 363,216 | 5/1887 | Dodge | 74/246 |
| 377,552 | 2/1888 | Ewart | 74/246 |
| 1,105,518 | 7/1914 | Irvin | 74/246 |
| 1,725,467 | 8/1929 | Marble | 74/246 X |
| 2,528,195 | 10/1950 | Von Bolhar | 37/69 X |
| 2,733,906 | 2/1956 | Joy | 74/246 X |

Primary Examiner—Clifford D. Crowder
Attorney, Agent, or Firm—Townsend and Townsend

[57] ABSTRACT

A sprocket driven chain of the type having links hingedly connected by pins. The chain includes replaceable, spool-like bushings on the link-connecting pins in which the bushings on the adjacent ends of adjacent pairs of links have arcuate surfaces in substantially 180° contact permitting pendulous lateral movement of the lower portion of a chain relative to the upper portion and to a vertical plane on which said chain is normally supported, and in which plane the links are articulated in movement of the chain around a sprocket. Alternate links of the chain include portions thereon engageable with the teeth of driving sprockets and a tumbler type support is in cooperative relation with alternate links of the chain to augment the driving force of the sprocket teeth. Links on a pair of corresponding parallel, endless chains in spaced opposed relation connected by spacers, cooperate with a pair of chain-supporting sprockets for maintaining the positions of the chains relative to each other where digging buckets are between and connected with the pair of chains, and the chains are disposed in vertical planes for longitudinal movement around the supporting sprockets.

15 Claims, 17 Drawing Figures

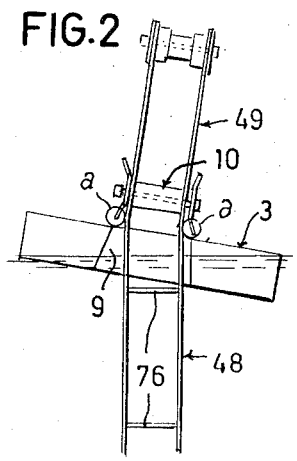
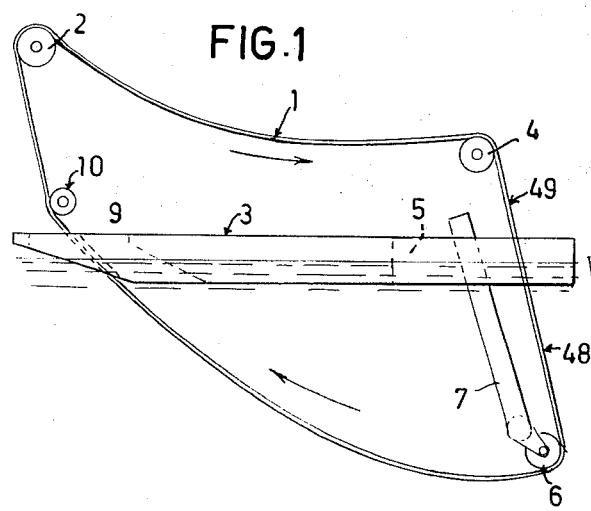
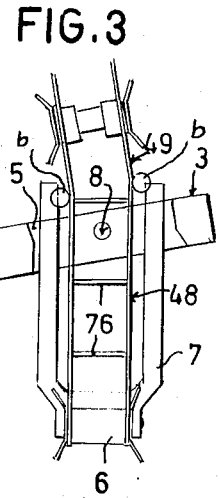
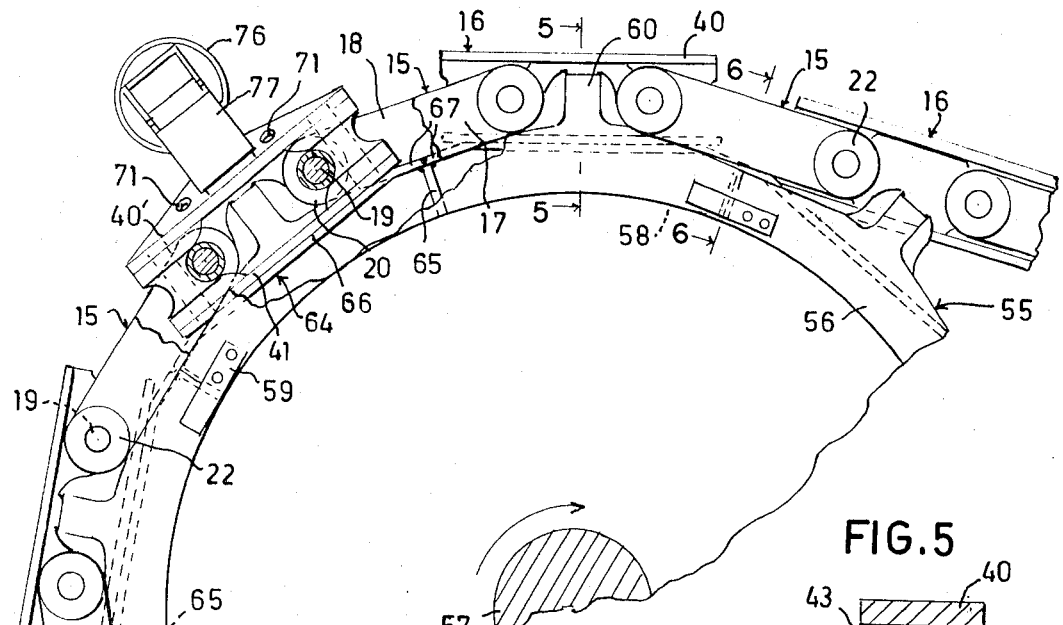
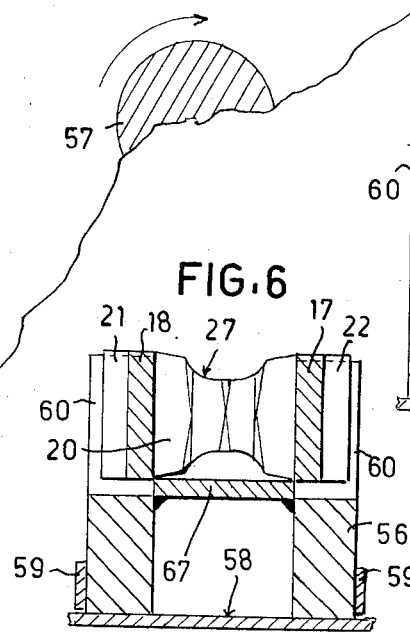

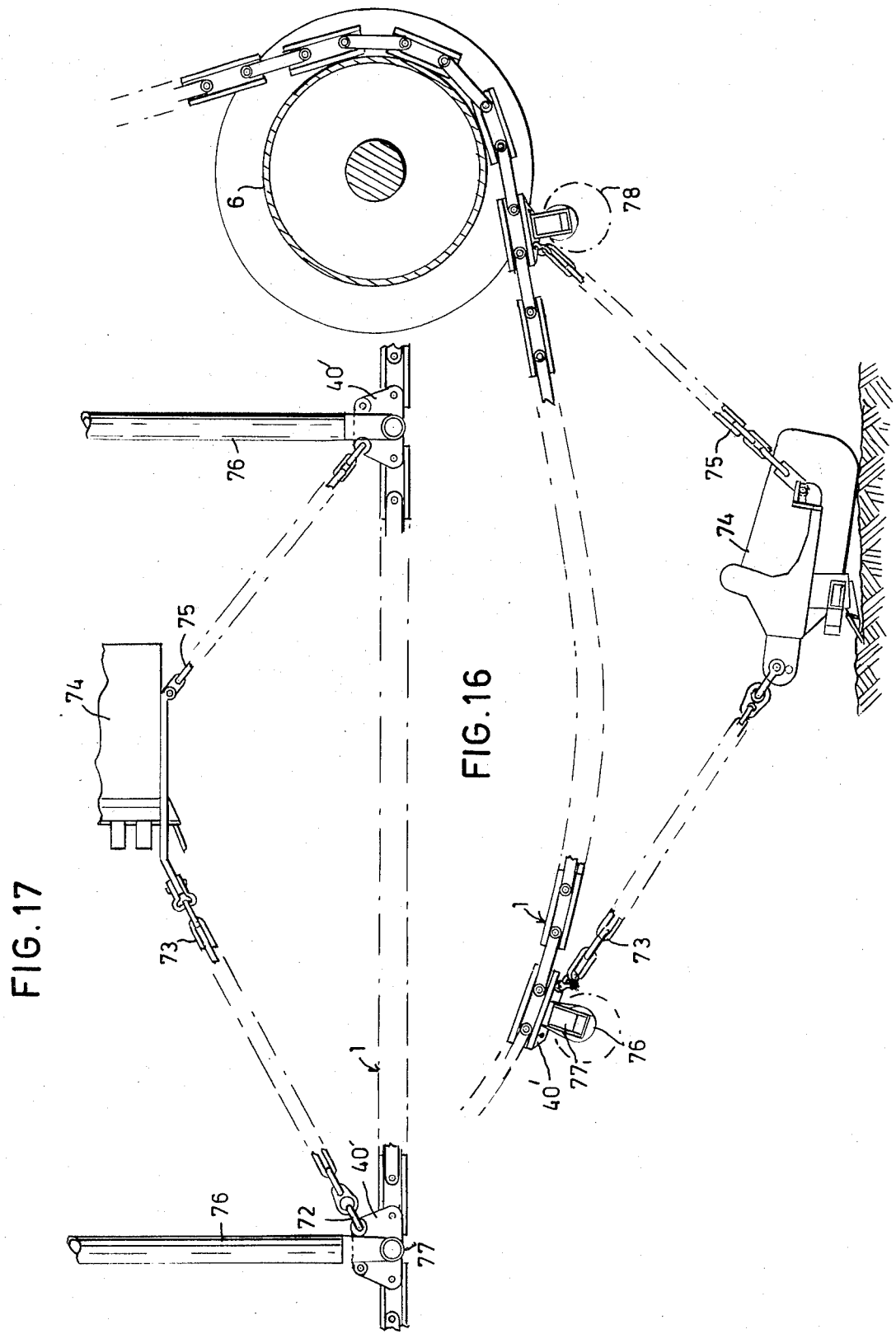

DREDGE CHAIN, SPROCKET, AND COMBINATION

SUMMARY

Heretofore the use of chains for connecting and moving the digging buckets of a bucket line suspended from a dredge, has not been entirely satisfactory. Anchor type chains have only point contact between adjacent pairs of links. At best it may be line contact, but in any event the wear is excessively rapid and as a result the strength ability of the chains in relation to their weight is not entirely acceptable for dragline dredging. Nor are anchor-type chains best suited for the running speed required.

The chain and structure herein often described is particularly well suited for dragline dredging as shown and described in my co-pending application for U.S. Pat. Ser. No. 209,584, now U.S. Pat. No. 3,766,671 filed Dec. 20, 1971.

The use of conventional hinge type chains having pins hingedly connecting adjacent pairs of links with parallel side bars is not satisfactory for use with a bucket line in dredging in water, and particularly in salt water, due to rapid corrosion resulting in adjoining links becoming frozen solid. The use of the hinge type chains for supporting an endless chain from a barge, as in said application, has made it necessary to pendulously suspend the entire chain-system from the barge to accommodate the system to the roll of the barge under the influence of wave motion.

One of the objects of the present invention is the provision of what may be called a "hinge type" chain that overcomes the objections to conventional chains, as above set forth.

Another object of the invention is the provision of a hinge type chain in which the wear engaging surfaces between adjacent links are in approximately 180° contact while permitting articulation of the links of adjacent pairs laterally relative to the longitudinal movement of the chain and in vertical planes at right angles to each other.

A still further object of the invention is the combination of a drive sprocket wheel having driving teeth engageable with alternate drive links of a hinge type chain having connecting intermediate links, which are between spaced annular, coaxial rows of teeth on such drive sprocket, and in which chain the wearing surfaces between the connections between adjacent links are in loose, slidable contact to be self cleaning of corrosion during longitudinal or lateral movement of the links relative to each other.

An additional object is the provision of an endless bucket line in which the buckets of the line are centered between and flexibly connected with a pair of spaced hinge type chains which chains are each supported between a coaxial pair of annular rows of sprocket teeth with the links of each chain being supported on planar surfaces rigid with the teeth of each row, to contribute to the driving force applied to the chain.

Another object of the invention is the provision of a hinge type, sprocket driven chain in which the parts having the surfaces subject to wear are readily replaceable.

An additional object of the invention is the combination of a sprocket wheel having a pair of coaxial, spaced, opposed annular rows of sprocket teeth between which rows extends a sprocket chain comprising a succession of articulatively connected, alternately positioned drive and intermediate links respectively characterized by pairs of elongated, flat sided bars extending longitudinally of the chain in which the flat sides of the bars of each pair are in spaced opposed relation with the bars of the drive links in planes at right angles to the bars of the intermediate links, and which drive links are engaged at one of their ends by the teeth of said rows for driving said chain in one direction, while one of the bars of each of several of said intermediate links is supported against one of annular row of axially outwardly facing flat surfaces disposed between said rows of sprocket teeth, during movement of said chain in said one direction.

Other objects and advantages will appear in the description and drawings.

DESCRIPTION OF DRAWINGS

FIG. 1 is a small schematic side view of a dragline dredge system similar to that shown in my hereinbefore mentioned application for patent, with one of the endless chains indicated in double lines.

FIG. 2 is a schematic view looking toward the bow end of the barge of FIG. 1, with guides, not shown in FIG. 1, being indicated.

FIG. 3 is a schematic view similar to that of FIG. 2 looking toward the stern end of the barge.

FIG. 4 is an enlarged, fragmentary side-elevational and part cross-sectional view of a portion of dredge chain extending over and in driving relation with a driving sprocket on a chain supporting drum.

FIG. 5 is an enlarged, fragmentary cross-sectional view showing the position of an intermediate link only, relative to the sprocket teeth, as seen from line 5—5 of FIG. 4.

FIG. 6 is an enlarged, fragmentary cross-sectional view showing the position of a drive link only, relative to the sprocket teeth, as seen from line 6—6 of FIG. 4.

FIG. 16 is a reduced size elevational view of the lower portion of the dragline indicated in FIG. 1 showing a bucket connected with one of the pair of chains.

FIG. 17 is a top plan view of the lower portion of the dragline of FIG. 16 at one side of a medial line between a pair of dragline chains, the portion at the other side

DETAILED DESCRIPTION

Figure 7:
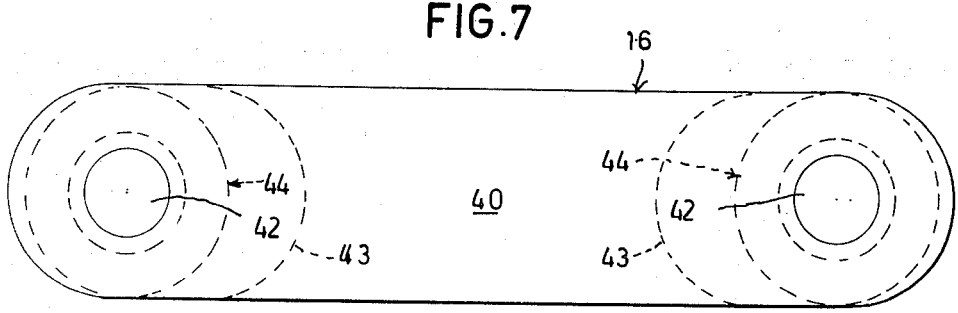
FIG. 7 is an enlarged plan view of one of the horizontally extending intermediate links separate from the others.

Endless dredge chains generally designated 1 and diagrammatically shown in FIGS. 1–3 having buckets connected therewith (FIGS. 16, 17), extend over a drum 2 at the bow end of a barge 3 and then over a drum 4 at the stern end. From drum 4 the chains extend downwardly through a slot 5 in the barge to and across a fairlead or drum 6 on the lower end of a boom 7 that, in turn, is supported on the barge for pendulous movement about a pivot 8 so the boom will remain vertical during rocking of the barge. From the drum the chains extend upward through an opening 9 in the bow end of the barge past a guide drum 10 to the drum 2. The foregoing appoximately corresponds to the arrangement shown in my aforementioned co-pending application for United States Letters Patent, except that the chains in the present invention are of the hinge-type, and are constructed to enable the chain-supporting system above the barge to rock with the barge (FIG. 2, 3) while the portions below the barge will remain in a substantially vertical plane during a dredging operation.

The drums 2, 4, 10 are supported on the barge 3 as are sets of fuide rollers *a* and *b* indicated in FIGS. 2, 3 but not shown in FIG. 1.

CHAIN LINKS

In describing the chain links the words "drive links" refer to the links that are engaged, or adapted to be engaged with the power driven sprocket teeth, while the words "intermediate links" refer to the links that connect and extend between each adjacent pair of drive links.

Figure 9:
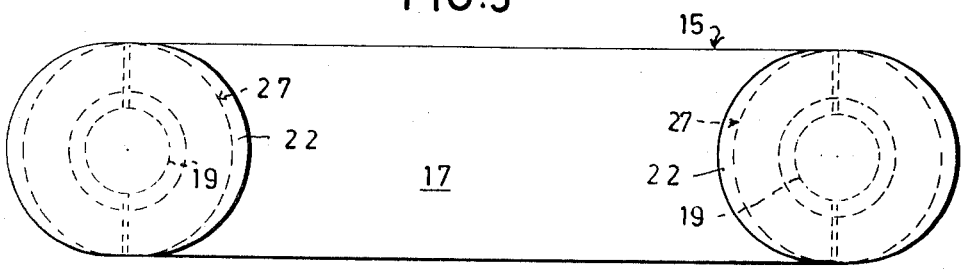
FIG. 9 is a side elevational view of a horizontally extending driving link separate from the others.

Each chain comprises drive links 15 (FIGS. 4, 9, 10) alternating with intermediate links 16 (FIG. 4). Each drive links 15 comprises a pair of elongated, flat sided bars 17, 18 (FIGS. 4, 9, 10) of the same length rounded at their ends in the planes of the bars, and connected at their ends by pins 19 that are rigid therewith. Pins 19 each extend through coaxial openings in the correspondingly positioned ends of bars 17, 18, said bars being in parallel side by side relation with one of their flat sides in opposed relation.

Figure 10:
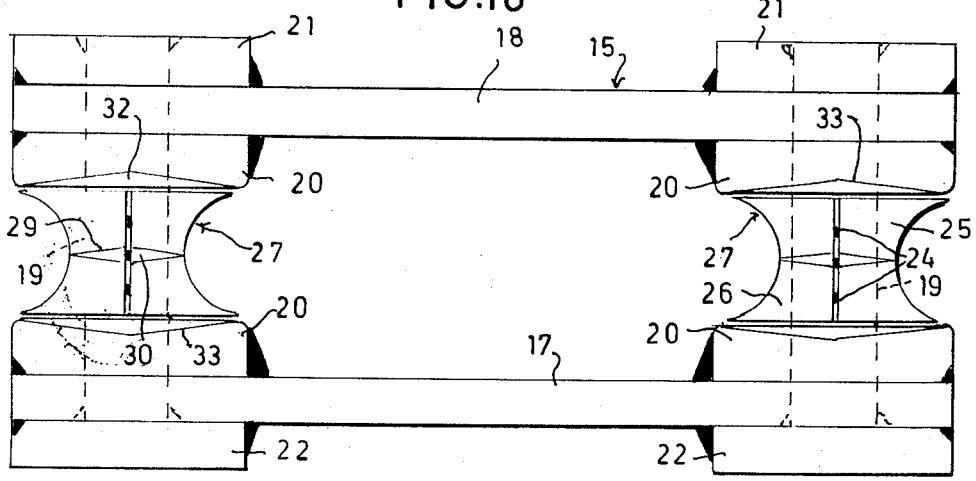
FIG. 10 is a side view of the link of FIG. 9.

Correspondingly shaped coaxial hubs 20 may be welded to the opposed sides of bar 17, 18 at their ends, or they may be formed integral with the bars. Pins 19 extend through openings in said hubs 20 that are coaxial with the openings in the ends of bars 17, 18. One of the end portions of pins 19 project outwardly of bars 18 and into openings in bosses 21 on the outer side of said bar, which bosses generally conform in outline to the outer peripheral outline of hubs 20. Bosses 21 are welded to bars 18 and one of the terminal ends of pins 19 are welded to bosses 21 (FIG. 10).

The opposite ends of pins 19 may terminate at the outer surface of bar 17, and bosses 22 that correspond in size and shape to bosses 21, but imperforate, extend across the terminal ends of the pins 19 that extend into bar 17. Bosses 22 and said terminal ends of pins 19 are welded to bar 17 (FIG. 10).

The outer peripheries of hubs 20 and bosses 21, 22 at the terminal ends of bars 17, 18 correspond to the curvatures of the rounded terminal ends of bars 17, 18, which curvatures are developed about center on medial lines extending longitudinally of the bars, with radii equal to half the width of each bar, providing semicircular forwardly and rearwardly facing end surfaces at the ends of the bars 17, 18 and which surfaces are flush with the correspondingly facing surfaces of the hubs 20 and bosses 21. These surfaces are each at a right angle to the flat sides of the bars 17, 18.

The use hereof of the words "forward" and "rear" and words of similar import are used with respect to the normal direction of movement of the chains as indicated in FIG. 4. The word "laterally" will be used with reference to surfaces on the links, that face transverely of the plane in which the chain (where endless) is positioned, or of movements of portions of the chain in a direction transversely of such plane.

The hub and bosses on each drive link are preferably slightly elongated longitudinally of the bars 17, 18 (FIG. 9), and their forwardly and rearwardly facing sides are circular in outline.

Figure 11:
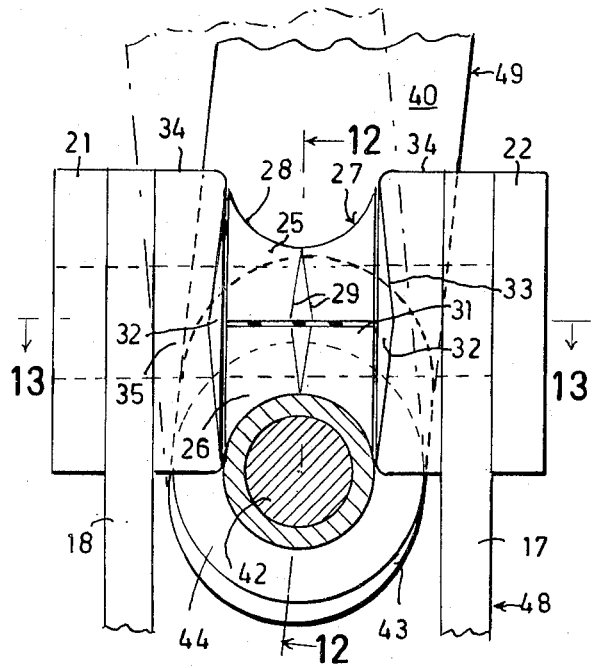
FIG. 11 is an enlarged, fragmentary, part elevational and part sectional view of one of the connected end portions of a driving link and an intermediate link showing the pendulous relation between them, as would occur during the roll of a chain supporting barge to one side, as seen in FIG. 2.

Spot welded at 24 to each other and to each pin 19 are halves 25, 26 of a spool generally designated 27. The line of division between the halves of each spool is longitudinally of the pin 19 (FIG. 11) and the radially outwardly facing surfaces 28 of each spool are concave-convex in planes at right angles to each other, the convexly extending surfaces being developed about radii of different lengths, form the axis of each pin 19 in planes normal to said axis, while the concave surfaces are developed about radii from centers spaced outwardly of and around said axis and in planes disposed longitudinally of and intersecting said axis. These concave-convex surfaces are adapted to engage complementary surfaces on spools at the ends of links 16 as will later appear.

Lines 29 (FIG. 11) indicate the bounds of an area 30 flattened axially of each spool 27 centrally between the ends of the spool and at opposite sides. The cross-sectional contour of the spool within the area outlined as well as to the ends of each spool, is circular in planes extending transversely across said axis at right angles thereto (FIG. 12).

Figure 14:
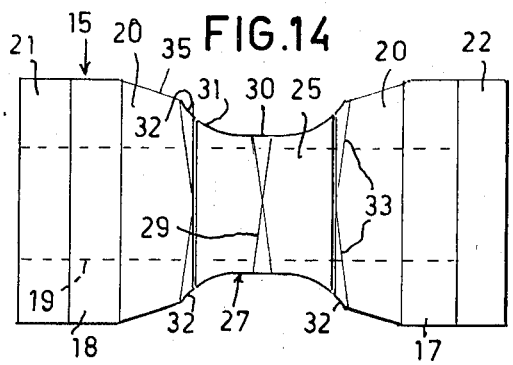
FIG. 14 is an end view of a drive link separate from an intermediate link.

The concavely extending surfaces 31 at opposite sides of area 30 continue across portions of hubs 20 as indicated at 32 (FIGS. 11, 14) and lines 33 show the circumferential and axial extent of the relief effected by surfaces 32 on the hubs.

Figure 12:
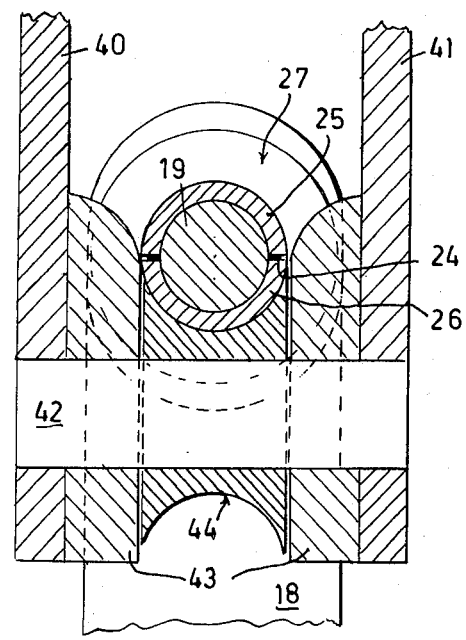
FIG. 12 is a cross-sectional view along line 12—12 of FIG. 11, one connecting pin being in elevation.
Figure 13:
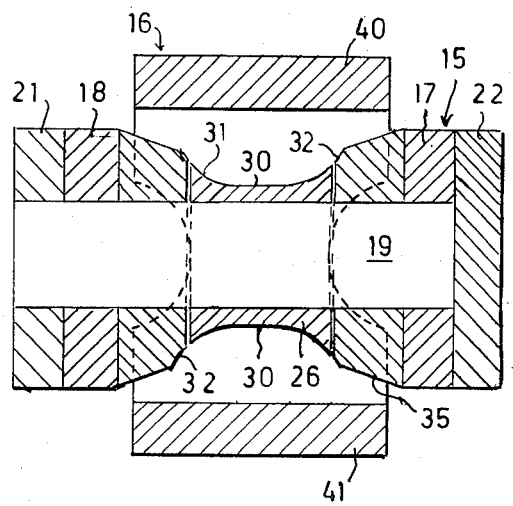
FIG. 13 is a cross-sectional view along line 13—13 of FIG. 11, one connecting pin being in elevation.

The two opposite, circularly extending rearwardly and forwardly facing surfaces 34 on hubs 20 (FIG. 11) are parallel with the axis of pin 19, axially of the latter, but the other two radially outwardly facing lateral surfaces 35 (FIGS. 13, 14) extend convergently toward each other from bars 17, 18, and which inclination progressively decreases to meet surfaces 34 (FIG. 12).

The spools 27 will hereinafter be called "drive" spools wherever confusion may result, to distinguish them from "intermediate" spools on links 16.

Each intermediate link 16 comprises a pair of parallel, flat sided, intermediate bars 40, 41 of equal length (FIGS. 4, 7, 8) rounded at their ends in the same manner as the ends of drive bars 17, 18 of links 15. The corresponding end portions of the intermediate bars are connected by and are rigid with intermediate pins 42. Pins 42 correspond, in diameter, to pins 19.

Figure 8:
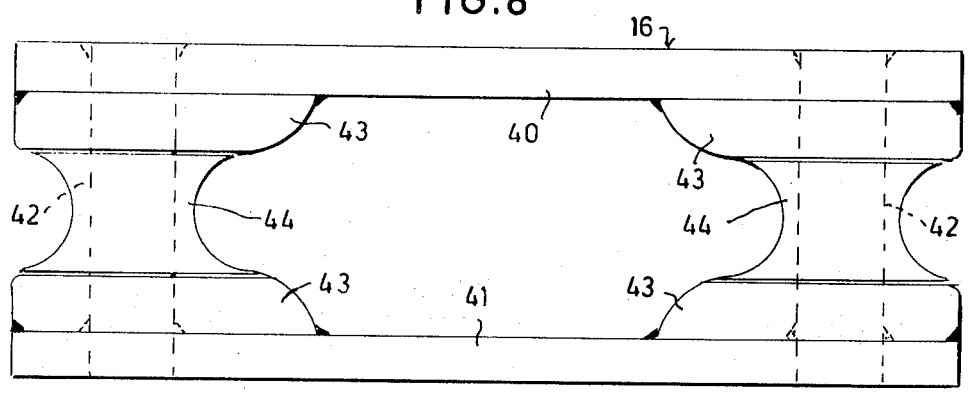
FIG. 8 is a side elevational view of the link of FIG. 7.

There are no bosses on the ends of intermediate links 16, such as are shown on links 15, but hubs 43 of corresponding shape and size are rigid with the end portions of bars 40, 41, and project toward each other from the opposedly facing surfaces of said bars. Said hubs 43 may be integral with bars 40, 41, or they may be welded thereto as indicated in FIG. 8.

Intermediate pins 42 extend through coaxial openings in hub 43 and bars 40, 41 and terminate at their outer ends at the outer surfaces of bars 40, 41. The terminal ends of pins 42 are welded to bars 40, 41, hence are rigid with the latter.

Each hub 43 is elongated longitudinally of the bar carrying it, with the oppositely outwardly facing surfaces of said hubs at the terminal ends of the bars 40, 41 being flush with said terminal ends, and of a circular outline corresponding to that of said ends.

The widths of drive bars 17, 18 and intermediate bars 40, 41 are the same, and the dimensions of the hubs 43 are the same as the width of the bars carrying them.

The adjacent portions of hubs 43 on each of the bars 40, 41 preferably extend toward each other a greater distance than the portions extending to the ends of the bars.

The spacing between bars 40, 41 is the same as the spacing between bars 17, 18, but the width of bars is less than the spacing between the bars of each pair.

Figure 15:
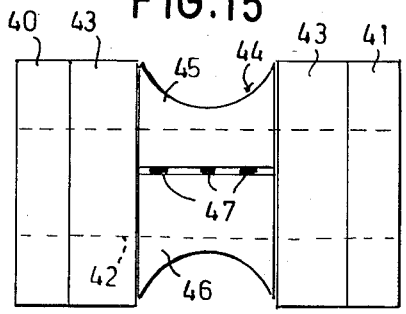
FIG. 15 is an end view of an intermediate link separate from a drive link.

Spools or bushings generally designated 44 are in halves 45, 46 that are spot welded at 47 (FIG. 15) to each pin 42 with which the bars 40, 41 and hubs 43 are rigid. The line of division between the halves 45, 46 is in a plane bisecting each pin longitudinally thereof.

THE CHAINS

Links 15, 16 alternate with each other in a chain. In the system shown in FIGS. 1-4 and FIGS. 16, 17, the endless chains 1 are in vertical planes, and the flat sides of bars 17, 18 on the drive links are in planes parallel with the plane of each chain, while the flat sides of bars 40, 41 are in planes at right angles to the planes of the chains.

Spools 27 on the adjacent ends of the pairs of links 16 at opposite ends of each drive link 15 extend between the spools 44 on the adjacent intermediate link. The axes of spools 44 extend normal to the axes of spools 27 when the chain is straight and the concave-convex surfaces of the drive and intermediate spools are complementary, hence, when the chain is taut, there will be approximately 180° contact between the engaging surfaces of each drive spool with an intermediate spool, in the plane in which the chain is disposed and in a plane normal thereto.

The relieved surfaces 30, 32 respectively on each drive spool and the hubs 20 adjacent thereto permit the angular movement between the lower portion 48 of the chains 1 (FIGS. 2, 3, 11) and the upper portion 49 upon rolling of the barge to one side or the other. Without such relief, spools at the point of lateral flexure of the chains would be moved out of engagement with each other by reason of a lower spool at said point crawling upwardly over a hub on the upper spool.

By splitting each spool and spot welding each half to one of the pins, the halves are readily removed and replaced by welding, it being noted that the ends of the spools are slightly spaced from the hubs at their ends. Each spool is restricted in length to provide wearing surfaces only, and relatively small areas 30 on the opposite sides of the drive spool are negligible portions of the surfaces in engagement with spools 44.

SPROCKET FOR CHAINS

Sprocket 55 (FIG. 4) is illustrative of a drive sprocket, such as one of the sprockets on a drum 2 (FIG. 2) or on drum 4 where the latter is driven, although it may be used wherever found desirable.

A sprocket at one end only of drum 2 will be described, since both are the same, and the chain is adapted for use on a single sprocket wherever desired.

The sprocket 55 comprises a pair of coaxial annular rings 56 in spaced opposed relation supported on a central shaft 57 by any suitable means. FIGS. 4, 5 show a cylindrical drum, with the rings rigid thereon. In the installation disclosed the inner diameter of each ring may be approximately 7 or 8 feet, and the ring is in segments bolted together by strips 59 welded to one segment and bolted to the adjoining segment. The segments are rigid on the drum and there may be shims between the segments and the drum.

An annular row of equally spaced teeth 60 are integral with each ring, and the spacing between said teeth is approximately equal to the spacing between the adjacent ends of each adjacent pair of drive links 15 (FIG. 4).

Extending around, and spaced outwardly of the outer periphery of drum 58 is a polysided chain-support generally designated 64. This support is rigidly secured on supporting spacer strips 65 that are welded to the drum at equally spaced points around the latter and that extend radially outwardly of the latter.

In FIG. 4 support 64 is shown in strip-like sections 66, 67 that are welded together at their adjacent ends, and to each spacer 65.

Sections 66 are relatively long, compared to the lengths of sections 67, and project oppositely equal distances from each tooth 60 in a direction circumferentially of rings 56, with their opposite end portions 67 extending angularly toward the drum to approximately meeting relation over the spacers. Thus, sections 67 are integral continuations of sections 66, and are spaced a greater distance from drum 58 than sections 66. The sctions 66 are flat, and as seen in FIG. 5, each is supported along its longitudinally extending marginal portions on projections or ledges 68, on rings 56 to which it is welded.

The spacing between the annular rows of teeth 60 is slightly greater than the width of bars 40, 41 of intermediate links 16 (FIG. 5), and said spacing is substantially equal to the distance between the drive bars 17, 18 (FIG. 6). The width of each tooth 60 axially of the sprocket is at least equal to the combined thickness of each bar 17, 18 and the bosses 21, 22 adjoining it.

By the above structure, chain 1 will extend between the annular rows of teeth 60 with a bar 41 of each of the alternate intermediate links flat on one of the sections 66 for substantially its entire length. The teeth 60 on the sprocket will extend between the adjacent ends of the adjacent pairs of drive links 15, and upon rotation of the sprocket in one direction or the other, a tooth on each of the two annular rows will engage one of the ends of bars 17, 18 and the boss adjoining it for driving the chain. The sections 67 of the chain support 64 extend between links 17, 18 along the portion of the chain that is supported on said support, and, as seen in FIG. 5, the central portions of bar 40, when seated on section 66, is disposed between portions of rings 56 that are radially inwardly of teeth 60.

By this combination of teeth 60 and the tumbler arrangement of sections 67, the driving force applied to the chain by the teeth is approximately doubled.

SPACERS AND BUCKET CONNECTORS FOR PAIR OF CHAINS

In FIGS. 2-4 and 16, 17, the bars 40', of certain pairs of opposedly positioned links of the pair of parallel, spaced endless chains, are the same as bars 40, except that they project toward each other into the space between the chains, and each is formed with a pair of openings 71 (FIG. 4) one of which, on one of the links of an opposedly positioned pair thereof is for the leading link 72 of one of the chains 73 (FIGS. 16, 17) that extend to and are connected with the leading end of an excavating or dredging bucket 74. The chains 73 extend convergently rearwardly from their connections with bars 40'.

Similar chains 75 are connected with each bucket 74 rearwardly of the connections with chains 73, and said chains 75 extend divergently rearwardly from said bucket to connect at their rear ends with a lateral extension of bar 40' on each chain 1.

As seen in FIGS. 2, 3, the drums 2, 3 may carry sprockets 55, and in each instance the chain supports 66 support the intermediate links 40 and 40' in positions to clear the outer ends of teeth 60.

In FIGS. 2, 3, parallel spacers 76 extend between chains 1, and bars 40' provide means for supporting said spacers thereon, which means may comprise posts or elements 77 rigid on each bar 40 and projecting outwardly therefrom. The spacers themselves may be tubular and rigidly connected at their ends with posts 77.

In some instances the spacer may comprise hollow enclosed tubular floats of substantial diameter, as indicated in broken lines 78 in FIG. 16.

OPERATION

Chains 1 of the construction described are adapted to be operated at the relatively high speeds economically essential to underwater dredging, and the extensive wearing surfaces in engagement between adjacent links extends the life of the chain to where it is practical and econical to use chains. These wear-spools, being split and spot welded to the pins connecting bars 17, 18 and 40, 41 (and 40', 41) enable quick removal and replacement.

The relieved surfaces on the drive spools provide for limited lateral movement between adjacent links, while the relative movement between the links in the plane of each chain is unrestricted. This lateral movement between links enables the use of a hinge type chain having engaging wear spools of the kind described.

The wearing parts on adjacent links are in loose contact, and the bars of the links open and rigid with the spools, making them self-cleaning of corrosion. "Loose contact" means that the spools on the adjacent ends of the links are not confined to positions in engagement with each other, as is usual in hinge or roller type chains where corrosion will freeze them together.

The teeth 60 preferably have wear resistant facings on their circumferentially facing sides, as seen in FIG. 4, which is readily replaceable, and the bearing contact between the drive links and teeth may be varied by varying the thickness of the bosses 21, 22. As seen in FIG. 6, thicker bosses may be used if desired.

The limitation to driving every other link by a tooth on the sprocket instead of every link is overcome by the two rows of teeth on the sprocket, and in addition, the bedding of one of the connecting bars of each intermediate link provides additional driving force, and also overcomes the downward pull on the pair of chains of a pair, as the chains pass around each sprocket.

The bosses 21, 22 themselves may be replaced, or any wear on the driving faces of the bosses and ends of bars 17, 18 may be quickly overcome by welding and then grinding to exact configuration with a radial jig fixed to the adjacent pin hole.

I claim:

1. A drag chain adapted for connection with the dredge buckets of an endless bucket-line floatingly suspended in a substantially vertical plane for movement of the chain longitudinally thereof, said chain comprising:
   a. adjacent pairs of pivotally connected, elongated links in generally end to end relation, each adjacent pair comprising a drive link and an intermediate link;
   b. each drive link having a pair of elongated spaced, opposed drive bars in side by side relation, and each intermediate link having a pair of elongated, spaced, opposed intermediate bars in side by side relation with each pair of drive bars disposed in a plane at a right angle to each pair of intermediate bars;
   c. intermediate spools between the end portions of the intermediate bars of each intermediate link with ends respectively adjacent said intermediate bars, and drive spools between the end portions of the drive bars of each drive link with ends respectively adjacent said drive bars and one of the drive spools at one of the ends of each drive link of said adjacent pairs of links extending between the intermediate spools at the end portions of each intermediate link;
   d. said drive spools being rigid with said drive bars, and said intermediate spools being rigid with said intermediate bars, and said drive spools and said intermediate spools having arcuate, concavo-convex complementary outer wear surfaces between their ends in planes respectively at right angles to each other providing approximately 180° surface engagement between each drive spool and each intermediate spool in said planes;
   e. said adjacent pairs of links having substantially unrestricted articulation relative to each in the plane of the chain when in endless form and means of said drive spool providing a predetermined degree of articulation between adjacent links laterally relative to said last mentioned plane.

2. In a chain as defined in claim 1:
   f. said outer wear surfaces on said drive spools and said intermediate spools being in engagement with each other and extending substantially from end to end of each of said spools.

3. In a chain as defined in claim 2:
   g. means respectively rigid with said drive spools and with said drive bars spacing and drive spools centrally betweeen the end portions of said drive bars, and means respectively rigid with said intermediate bars and said intermediate spools spacing said intermediate spools centrally between the end portions of said intermediate bars.

4. In a chain as defined in claim 3:
   h. said means between said drive spools and drive bars, and said means between said intermediate spools and said intermediate bars compressing drive hubs disposed between the ends of each drive spool and each of the drive bars of each drive link, and intermediate hubs disposed between the ends of each intermediate spool and each of the intermediate bars of each intermediate link.

5. In a chain as defined in claim 1:
   f. a drive pin extending centrally through and rigid with each drive spool and through and rigid with the drive bars outwardly of the ends of each drive spool, and an intermediate pin extending centrally through and rigid with each intermediate spool and through and rigid with the intermediate bars outwardly of the ends of each intermediate spool.

6. In a chain as defined in claim 5:
   g. said drive spools each being in separate sections divided longitudinally of each drive pin for removal and replacement free from disasembly of the drive pins from said drive bars, and said intermediate spools each being in separate sections divided longitudinally of each inermediate pin for removal and replacement free from disassembly of the intermediate pins from said intermediate bars.

7. In a chain as defined in claim 1;
   f. the terminal ends of each pair of drive bars having sprocket-teeth-engaging surfaces, and means rigid with the end portions of said drive bars having surfaces corresponding to said sprocket-teeth-engaging surfaces in cooperative relation to the latter for taking a portion of the driving force of sprocket teeth when such teeth are in driving relation with said surfaces.

8. In a chain as defined in claim 1:
   f. the drive bars of each drive link being flat sided with one of the flat sides of each drive bar in opposed relation to the other, and the intermediate bars of each intermediate link being flat sided with one of the flat sides of each intermediate bar in opposed relation to the other;
   g. the flat sides of the drive bars being in planes at a right angle to the plane in which the flat sides of said intermediate bars are positioned.

9. In a chain as defined in claim 8:
   h. hubs rigid with opposite ends of each of said pairs of drive bars projecting toward each other approximately to the ends of said drive spools;
   i. a set of coaxial openings through each of said drive spools and the drive hubs and drive bars and a drive pin extending through the openings of each set rigidly secured to said drive spools, drive hubs and drive bars;
   j. the flat sides of said drive bars being in vertical planes when said chain is suspended vertically for said unrestricted articulation of said adjacent pairs of links relative to each other in said planes, and said means providing a predetemined degree of articulation comprising relieved portions of the hubs at the ends of each drive spool and of the concavely formed surfaces at two opposite sides of each drive spool to permit limited movement of the intermediate spool axially of the drive spool in engagement therewith and corresponding limited swinging of the drive and intermediate links in a lateral direction normal to the said planes in which the flat sides of said drive bars are positioned while the said correspondingly formed concavo-convex wear surfaces on said drive spools and intermediate spools are in said engagement with each other.

10. A drag chain as defined in claim 1, in combination with:
    f. a drive sprocket comprising a pair of annular, coaxial, axially spaced rigidly connected rows of radially outwardly projecting sprocket-teeth around a side of which said chain extends with one of the terminal ends of a pair of the drive bars of one of said drive links in driving engagement with one of the sprocket teeth of each of said rows when said sprocket is rotated in one direction;
    g. chain supporting means rigid with said teeth for supporting said chain in a position in which said terminal ends of said pair of drive bars are in said driving engagement with said sprocket teeth.

11. In the combination as defined in claim 10:
    h. said chain supporting means being between said rows of teeth, and one of intermediate bars of the intermediate links being directly supported on said chain supporting means.

12. In the combination as defined in claim 10:
    i. said chain supporting means having a plurality of radially outwardly facing, elongated, straight surfaces between said rows of teeth disposed around and longitudinally to a circle coaxial with the central axis of said rows;
    j. the intermediate bars of each intermediate link being elongated, and straight, and supported flat against said straight surfaces on said chain supporting means and extending longitudinally of the latter upon rotation of said sprocket wheels whereby the driving force of said sprocket teeth against said terminal ends of said drive bars will be augmented by said engagement between said intermediate bars and said chain supporting means.

13. In the combination as defined in claim 12:
    k. additional sprocket-teeth engaging means on and rigid with the end portions of said drive bars and projecting oppositely outwardly of each pair of drive bars for engagement with the teeth of said annular rows simultaneously with the engagement between said terminal ends of said drive bars and said teeth, and said teeth being sufficiently wide to so engage said additional means and the terminal ends of said drive bars.

14. A first and second drag chain and a first and second sprocket, each as defined in claim 10:
    h. means connecting said first and second sprockets for rotation about a horizontal axis, and said first and second drag chains being endless of the same length and respectively supported on one of the chain supporting means between the pair of endless rows of teeth of each sprocket with said chains suspended from said sprockets in a pair of vertically disposed, spaced, opposed planes;
    i. said chain supporting means on each sprocket having radially outwardly, straight, elongated surfaces around and disposed tangentially to a circle coaxial with said sprockets;
    j. one of the intermediate bars of each intermediate link being straight, and elongated and supported flat against one of said straight surfaces on said chain supporting means of each of said sprockets when said sprockets are rotated to drive said chains.

15. In the chains as defined in claim 14:
    k. the other of the intermediate bars of certain pairs, thereof at points spaced along said chains projecting from each chain toward the other and means thereon for connecting pairs of said projecting intermediate bars respectively at opposite points along the chains with a dredge bucket to be disposed between said pair of chains.

* * * * *